United States Patent
Wagner et al.

(10) Patent No.: US 9,587,549 B2
(45) Date of Patent: Mar. 7, 2017

(54) AIR GAP-INSULATED EXHAUST MANIFOLD

(71) Applicant: Eberspächer Exhaust Technology Gmbh & Co. KG, Neunkirchen (DE)

(72) Inventors: Andreas Wagner, Ebersbach (DE); Kresimir Jambrosic, Reichenbach (DE); Georg Wirth, Kirchheim/Teck (DE); Ralf Mohr, Heidelberg (DE); Jürgen Häberle, Stuttgart (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 130 days.

(21) Appl. No.: 14/269,268

(22) Filed: May 5, 2014

(65) Prior Publication Data
US 2014/0366525 A1 Dec. 18, 2014

(30) Foreign Application Priority Data
Jun. 18, 2013 (DE) .................. 10 2013 211 390

(51) Int. Cl.
*F01N 13/10* (2010.01)
*F02B 37/00* (2006.01)
(Continued)

(52) U.S. Cl.
CPC ......... *F01N 13/102* (2013.01); *F01N 13/107* (2013.01); *F01N 13/143* (2013.01);
(Continued)

(58) Field of Classification Search
CPC .... F01N 13/102; F01N 13/107; F01N 13/143; F01N 13/16; F01N 13/1827;
(Continued)

(56) References Cited

U.S. PATENT DOCUMENTS

| | | | |
|---|---|---|---|
| 2003/0116116 A1* | 6/2003 | Anton ................ | B32B 5/26 123/198 E |
| 2009/0158724 A1* | 6/2009 | Muller ................ | F01N 13/102 60/323 |
| 2010/0005793 A1* | 1/2010 | Sloss ................ | F01N 13/08 60/324 |

FOREIGN PATENT DOCUMENTS

| | | |
|---|---|---|
| DE | 10 2007 062 661 A1 | 6/2009 |
| DE | 10 2007 061219 A1 | 6/2009 |

(Continued)

*Primary Examiner* — Thomas Denion
*Assistant Examiner* — Brandon Lee
(74) *Attorney, Agent, or Firm* — McGlew and Tuttle, P.C.

(57) ABSTRACT

An air gap-insulated exhaust manifold (10) for a supercharged internal combustion engine (1), preferably of a motor vehicle has an engine flange (11) fastening the exhaust manifold to an engine block (2) and a turbine flange (12) fastening the exhaust manifold to a turbine (8) of an exhaust gas turbocharger (7). Two inner pipes (13, 14) lead from an inlet opening, for exhaust gas, adjacent to the engine flange to an outlet opening (18), for exhaust gas, adjacent to the turbine flange. An outer pipe (15) envelopes the two inner pipes, forming an air gap insulation (21), and extends from the engine flange to the turbine flange. A separation partition (16) separates, in the interior space (22) of the outer pipe, two interior spaces (23, 24), in which one each of the two inner pipes is arranged. Reduced wear is achieved with the partition arranged loosely at the turbine flange.

18 Claims, 3 Drawing Sheets

(51) Int. Cl.
*F01N 13/14* (2010.01)
*F01N 13/16* (2010.01)
*F01N 13/18* (2010.01)
*F02B 37/02* (2006.01)
*F02B 67/10* (2006.01)

(52) U.S. Cl.
CPC ......... *F01N 13/16* (2013.01); *F01N 13/1827* (2013.01); *F01N 13/1872* (2013.01); *F02B 37/001* (2013.01); *F02B 37/025* (2013.01); *F02B 67/10* (2013.01); F01N 2330/12 (2013.01); Y02T 10/144 (2013.01)

(58) Field of Classification Search
CPC .. F01N 2330/12; F02B 37/001; F02B 37/025; F02B 67/10; Y02T 10/144
See application file for complete search history.

(56) References Cited

FOREIGN PATENT DOCUMENTS

| | | |
|---|---|---|
| EP | 1 734 235 A1 | 12/2006 |
| EP | 2 075 430 A1 | 7/2009 |
| JP | S61 74623 U | 5/1986 |

\* cited by examiner

AIR GAP-INSULATED EXHAUST MANIFOLD

CROSS REFERENCE TO RELATED APPLICATIONS

This application claims the benefit of priority under 35 U.S.C. §119 of German Patent Application DE 10 2013 211 390.0 filed Jun. 18, 2013, the entire contents of which are incorporated herein by reference.

FIELD OF THE INVENTION

The present invention pertains to an air gap-insulated exhaust manifold for a supercharged internal combustion engine, preferably of a motor vehicle. The present invention pertains, in addition, to an exhaust system equipped with such an exhaust manifold for an internal combustion engine, preferably of a motor vehicle.

BACKGROUND OF THE INVENTION

An exhaust manifold is used as the inlet area of an exhaust system and merges the separate exhaust gas streams usually coming from a plurality of combustion chambers of the internal combustion engine. An exhaust manifold usually comprises for this an engine flange, with which the exhaust manifold can be fastened to an engine block of the internal combustion engine. Separate inlet openings, which are associated with the individual combustion chambers of the internal combustion engine, are, in turn, provided in the area of the engine flange. The exhaust manifold is usually connected permanently with a turbine flange on the discharge side in a supercharged internal combustion engine in order to feed the exhaust gases arriving from the internal combustion engine to the turbine as close to the engine as possible. Double-flow turbines, so-called twin-scroll turbines, may be used in internal combustion engines that have two cylinder banks or two groups of cylinders. To prevent the two cylinder groups from mutually interacting with one another, the exhaust gas is likewise routed in two flows up to the double-flow turbine, so that the exhaust manifold has separate manifolds for the two cylinder groups, which said manifolds lead each from a plurality of inlet openings to an outlet opening, and the two outlet openings of the separate manifolds feed the separate exhaust gas streams to separate inlet openings of the turbine in the turbine flange.

It is known that such an exhaust manifold can be equipped with an air gap insulation for improved heat insulation. This is achieved by an exhaust gas-carrying inner pipe being enveloped by an outer pipe, forming a gap, and this gap between the inner pipe and the outer pipe forms the desired air gap insulation. The outer pipe and inner pipe may also be called outer shell and inner shell, respectively.

For a supercharged internal combustion engine with twin-scroll turbine, an air gap-insulated exhaust manifold thus comprises an engine flange for fastening the exhaust manifold to the engine block of the internal combustion engine, a turbine flange for fastening the exhaust manifold to the turbine of the exhaust gas turbocharger, two separate inner pipes, which lead each from at least one inlet opening for exhaust gas arranged in the area of the engine flange to an outlet opening for exhaust gas arranged in the area of the turbine flange, as well as an outer pipe, which envelops the two inner pipes, forming an air gap insulation and extends essentially from the engine flange to the turbine flange.

The inner pipes may have a multipart design in order to make it possible to merge a plurality of inlet openings into a common outlet opening in a simpler manner. The individual members of the respective inner pipe may be inserted one into another to make relative motions caused by thermal effects possible. Leaks may develop due to these plug-type connections, as a result of which exhaust gas can escape from the respective inner pipe and enter the interior space of the outer pipe, which said interior space is enveloped by the outer pipe. Such tolerable leaks occur in a pulsed manner, corresponding to the working rhythm of the internal combustion engine. To prevent these pressure pulsations of the two cylinder groups within the exhaust manifold from mutually affecting each other, a partition, which divides the interior space of the outer pipe into two interior spaces, in which one of the two inner pipes each is arranged, may be arranged in the outer pipe. This partition advantageously extends from the turbine flange to the engine flange.

It was found that such a partition is subject to very high thermal loads because of it being positioned between the two inner pipes. In particular, the partition is subject to strong thermal expansion effects. Undesired wear may develop as a result.

SUMMARY OF THE INVENTION

The present invention pertains to the object of providing an improved embodiment, which is characterized especially by reduced wear, for an exhaust manifold of the type described in the introduction or for an exhaust system equipped therewith.

According to the invention, an air gap-insulated exhaust manifold is provided for a supercharged internal combustion engine. The exhaust manifold comprises an engine flange for fastening the exhaust manifold to an engine block of the internal combustion engine and a turbine flange for fastening the exhaust manifold to a turbine of an exhaust gas turbocharger. Two separate inner pipes lead each from at least one inlet opening for exhaust gas arranged in the area of the engine flange to an outlet opening for exhaust gas arranged in the area of the turbine flange. An outer pipe envelopes the two inner pipes, forming an air gap insulation. The outer pipe extends between the engine flange and the turbine flange. A separate partition separates two interior spaces, in which one each of the two inner pipes is arranged, from each other in the interior space of the outer pipe. The partition is arranged loosely at the turbine flange.

The present invention is based on the general idea of designing the partition as a separate component and arranging it movably, i.e., loosely, at least in relation to the turbine flange. The partition can move relative to the turbine flange, at least in the area of a front side facing the turbine flange, due to this design. As a consequence, the partition can expand based on thermal stress and move relative to the turbine flange in the process without a risk of excessive wear occurring. Furthermore, the risk of mechanical damage to the turbine flange due to the partition possibly supported thereon can be reduced due to the loose arrangement of the partition in relation to the turbine flange.

Corresponding to another advantageous embodiment, the partition may be guided at the turbine flange by guide contours in a positive-locking manner. A guiding is defined hereby for the motions of the partition relative to the turbine flange, which simplifies these relative motions and reduces the risk of wear. A positive-locking guiding can be achieved in an especially simple manner without additional components, because the partition is guided directly at the turbine flange if the guide contours are formed integrally on the turbine flange.

According to a preferred variant, the respective guide contour may be formed by a guide support, which is formed in the turbine flange and with which a lateral edge area of the partition meshes (engages) in a positive-locking manner. Such a guide support can be formed as an integral component at the turbine flange in an especially simple manner. In the area of a front side facing the turbine flange, the partition can simply mesh with lateral edge areas facing away from one another with the diametrically opposite guide supports, as a result of which a secure guiding is achieved for the partition.

The partition may also be arranged loosely at the outer pipe in another embodiment. This means that the partition is also arranged movably in relation to the outer pipe, i.e., it can, in particular, expand thermally without blocking with the outer pipe.

According to a preferred variant, the partition may be positioned at the outer pipe in positioning contours in a positive-locking manner. Such positioning contours can be integrated in the outer pipe in an especially simple manner. For example, the outer pipe may be manufactured as a shell construction, wherein the individual shells can be manufactured by means of the deep-drawing technique or blow-molding technique. Such positioning contours can thus be formed integrally with the outer pipe in an especially simple manner, without additional effort.

According to a preferred variant, the positioning contour may be formed by a positioning support, which is formed in the outer pipe and with which support a lateral edge area of the partition meshes. Permanent positioning is achieved by means of the respective positive-locking connection in this case as well, without additional fastening measures being necessary.

The respective positioning contour may extend, in principle, from the engine flange to the turbine flange on the outer pipe. However, an embodiment in which the respective positioning contour is located at a spaced location from the engine block and at a spaced location from the turbine flange is preferred. As a consequence, the positioning contour extends only over part of the respective lateral edge of the partition. For example, the respective positioning contour extends only over a maximum of 50% of the respective lateral edge of the partition. The respective positioning contour preferably extends over about 25% of the respective lateral edge. If the positioning contour does not extend over the entire respective lateral edge of the partition, the edge area of the partition, which cooperates with the positioning contour and consequently meshes with same, is preferably formed by a projection, which projects from the rest of the lateral edge and meshes with the respective positioning support.

The partition may also be arranged loosely at the engine flange in another embodiment. In other words, the partition can also move relative to the engine flange, as a result of which motions caused by thermal effects are possible here as well and stresses caused by thermal effects can be reduced.

According to an advantageous variant, the partition may be held at the engine flange in at least one holding contour in a positive-locking manner. The need for separate holding means are eliminated due to the use of a positive-locking connection in this case as well, as a result of which the holding contour can be embodied in an especially simple manner.

According to an advantageous variant, the respective holding contour may be formed by a holding support, which is formed in the engine flange and with which a front-side edge area of the partition meshes. Such a holding support can be manufactured integrally with the engine flange in an especially simple manner, for example, by taking it into account in an injection mold, which is used to manufacture the engine flange.

The turbine flange may have an open design in another advantageous embodiment. This means that an open connection is present within the turbine flange to the air gap insulation, i.e., to the intermediate space between the inner pipes and the outer pipe. As a result, the turbine flange will have a considerably simplified design, and, in particular, it is possible to eliminate a middle web, which extends between the two inner parts, in the area of the respective outlet opening. In addition, the risk of collision of the partition with the middle web can be efficiently avoided in the absence of a middle web.

The turbine flange may preferably have a single flange opening, which surrounds the two inner pipes in the area of the respective outlet opening and in which the partition ends in a detached manner on the front side. Due to the partition ending in a detached manner, the partition can move quasi as desired within the flange opening in the direction of the turbine, without colliding with an obstacle. The wear on the partition and turbine flange can be reduced in this manner.

The turbine flange may have a closed design in another embodiment. This means that the air gap insulation is also closed in the turbine flange. Leaks, which could lead to an undesired interaction between the two interior spaces separated from each other by the partition, can be avoided as a result in the area of the turbine flange as well.

The turbine flange may advantageously have two separate flange openings, which enclose each one of the inner pipes in the area of the respective outlet opening. Each inner pipe is thus enclosed in itself, preferably extensively tightly, for example, in the manner of a plug-type connection with sliding fit. The partition may be supported now on the front side at a support area of the turbine flange. Due to the front-side support of the partition at the turbine flange, efficient sealing can be achieved between the two interior spaces in this area as well. The support area is formed in this case at a middle web of the turbine flange, which separates the two flange openings from one another and which thus passes through between the two inner pipes.

Corresponding to an advantageous variant, the support area may have at least one elastic support element, via which the partition is supported on the turbine flange on the front side. Such an elastic support element thus makes relative motions possible between the partition and the aforementioned middle web of the turbine flange, without excessive mechanical stress developing in the process. Such an elastic support element may be formed, for example, by a wire mesh element. Such wire mesh elements are characterized by high thermal loadability as well as high elasticity.

The partition may be arranged in a detached or contactless manner, i.e., without contact, in relation to the two inner pipes. This measure also reduces the risk of wear.

Further, the partition may preferably be flat, so that it extends in a partition plane. As a result, the partition can be manufactured at an especially low cost. For example, the partition may be formed by a sheet metal body, which can be manufactured in an especially simple manner, for example, by means of a punching operation. In case of a flat partition, the partition may mesh with the respective guide support preferably in parallel to the plane of the partition.

Further, the partition may mesh with the respective positioning support in parallel to the plane of the partition. Finally, the partition may mesh with the respective holding support in parallel to the plane of the partition. Furthermore, provisions may be made for the partition to be arranged movably in the respective guide support in parallel to the plane of the partition, in which case the direction of motion is oriented in parallel to the direction of a gap between the engine flange and the turbine flange. Furthermore, the partition may be arranged movably in the respective positioning support in parallel to the plane of the partition, in which case the direction of motion is oriented at right angles to the direction of the gap between the engine flange and the turbine flange. Finally, the partition may be arranged movably in the respective holding support in parallel to the plane of the partition. The direction of motion is again oriented in parallel to the direction of the gap between the engine flange and the turbine flange in this case.

It is also possible, as an alternative, to make the partition uneven and to provide it, for example, with a curvature or crown. Such a curvature can help avoid unintended deformations during heating up and cooling. Such an uneven partition may also be flat or straight in the area of the respective guide contour in order to bring about linear guiding. This also applies analogously to the area of the respective positioning contour and/or of the holding contour.

It is also possible, according to another alternative, to provide the partition with a bent rim in the area of the respective positioning contour. The respective positioning contour is designed in this case to receive the rim. Further, it is possible, in principle, to provide the respective positioning contour with a mounting contour, which makes possible a positive-locking connection with the respective rim.

Two positioning contours, which are located diametrically opposite at the outer pipe, may be provided in another embodiment. Furthermore, the two positioning contours may be advantageously arranged approximately centrally between the engine flange and the turbine flange. A variant in which the positioning contours are used as fixed mounts for expansion motions of the partition oriented in parallel to the direction of the gap between the engine flange and the turbine flange, while the guide contours and at least one holding contour are used each as movable mounts, in which the relative motions between the partition and turbine flange, on the one hand, as well as between the partition and engine flange, on the other hand, take place.

Furthermore, provisions may be made for the partition, which is preferably flat, to extend essentially at right angles to a plane of the turbine flange. Simple kinematics is achieved hereby for the thermal expansion effects, as a result of which it is possible, in particular, to avoid warping and the like.

An exhaust system according to the present invention, which is intended for a supercharged internal combustion engine, especially in a motor vehicle, comprises a turbine of an exhaust gas turbocharger as well as an exhaust manifold of the above-described type, via which the exhaust system can be fastened to the internal combustion engine. The engine flange is fixed for this to the engine block of the internal combustion engine, while the turbine flange is fixed to the turbine of the exhaust gas turbocharger.

Further important features and advantages of the present invention appear from the subclaims, from the drawings, and from the corresponding description of the figures on the basis of the drawings.

It is obvious that the above-mentioned features, which will also be explained below, can be used not only in the particular combination indicated, but also in other combinations or alone, without going beyond the scope of the present invention.

Preferred exemplary embodiments of the present invention are shown in the drawings and will be explained in more detail in the following description, in which identical reference numbers designate identical or similar or functionally identical components.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
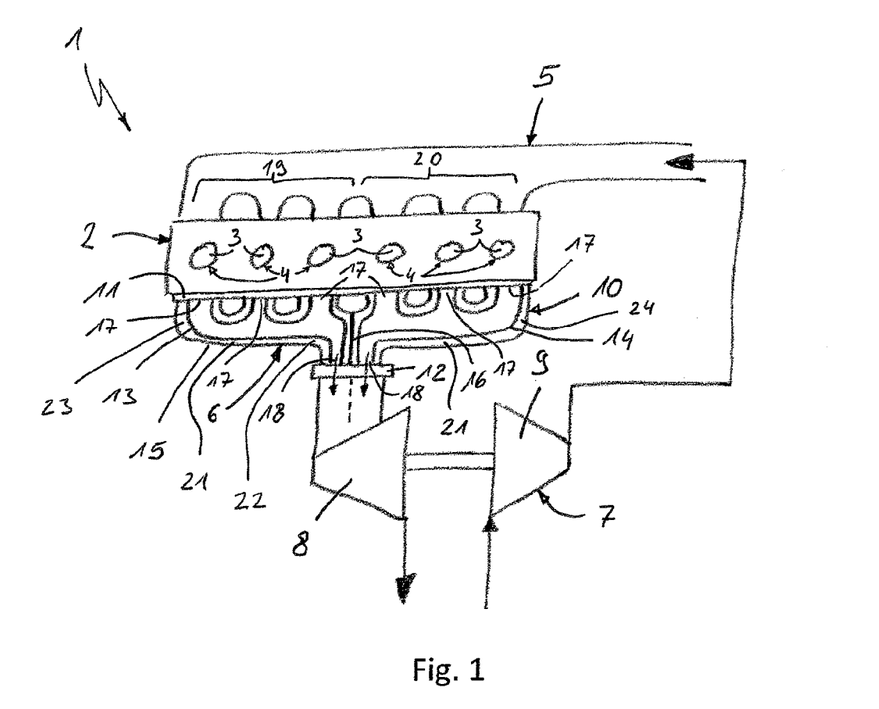
FIG. 1 is a highly simplified, diagram-like general view of an internal combustion engine with an exhaust system, which has an exhaust manifold shown in section.

Referring to the drawings in particular, corresponding to FIG. 1, an internal combustion engine 1 comprises an engine block 2 with a plurality of combustion chambers 3, which are formed by a cylinder 4 each in the usual manner, in which a piston each, not shown here, is arranged in such a manner that its stroke is adjustable. The internal combustion engine 1 has a fresh air feed unit 5 for supplying the combustion chambers 3 with fresh air. Further, an exhaust system 6 is provided, which removes exhaust gas from the combustion chambers 3 during the operation of the internal combustion engine 1. The internal combustion engine 1 is designed as a supercharged internal combustion engine 1. It is correspondingly equipped here with an exhaust gas turbocharger 7, which has a turbine 8 and a compressor 9 in the usual manner. The compressor 9 is integrated into the fresh air feed unit 5 and is drive-connected with the turbine 8, which is integrated into the exhaust system 6. The exhaust system 6 has an exhaust manifold 10, which connects the block 2 with the turbine 8.

Corresponding to FIGS. 1 through 6, the exhaust manifold 10 has an engine flange 11, which is used to fasten the exhaust manifold 10 to the engine block 12. The exhaust manifold 10 has, in addition, a turbine flange 12, which is used to fasten the exhaust manifold 10 to the turbine 8. Further, the exhaust manifold 10 comprises two separate inner pipes 13, 14, an outer pipe 15 as well as a partition 16. The respective inner pipe 13, 14 extends from at least one inlet opening 17 arranged in the area of the engine flange 11 to an outlet opening 18 arranged in the area of the turbine flange 12. In the example shown in FIG. 1, the engine block 2 has six cylinders 4, which are combined in two cylinder groups 19, 20, so that each cylinder group 19, 20 has exactly three cylinders 4. The two inner pipes 13, 14 are separately associated with these two cylinder groups 19, 20. Each inner pipe 13 correspondingly has three inlet openings 17 and one outlet opening 18. Consequently, two such outlet openings 18 are merged at the turbine flange 12. The turbine 8 is preferably designed as a twin-scroll turbine, i.e., as a double-flow turbine 8, so that the two outlet openings 18 of the exhaust manifold 10 are led in separate exhaust gas paths in the turbine 8. The two inner pipes 13, 14 may also be called inner shells 13, 14.

The outer pipe 15, which may also be called outer shell 15, envelops the two inner pipes 13, 14, such that an air gap insulation 21 is formed now. The outer pipe 15 extends here essentially from the engine flange 11 to the turbine flange 12. The outer pipe 15 is connected permanently directly with the engine flange 11 and with the turbine flange 12 in the examples being shown. It is likewise conceivable to fasten the outer pipe 15 indirectly to the engine flange 11 and/or to the turbine flange 12, namely, via the respective inner pipe 13, 14, which is permanently connected at least in this case with the engine flange 11 and with the turbine flange 12, respectively.

The partition 16 forms a separate component in relation to the inner pipe 13, 14, outer pipe 15, engine flange 11 and turbine flange 12. The partition 16 is arranged in an interior space 22 of the outer pipe 15, such that it separates two interior spaces 23, 24 from one another in the interior space 22. One of the two inner pipes 13, 14 each is arranged in each interior space 23, 24.

Corresponding to FIGS. 2 through 6, the partition 16 is arranged loosely at the turbine flange 12, i.e., it is not fixed to it directly, so that the partition 16 is movable relative to the turbine flange 12. According to FIGS. 2, 3 and 5, guide contours 25, which guide the partition 16 in a positive-locking manner, are formed on the turbine flange 12. The respective guide contour 25 is formed here by a guide support 26, which is formed directly in the turbine flange 12 and with which meshes a lateral edge area 27 of the partition 16 in a positive-locking manner.

The partition 16 may be arranged, in addition, loosely at the outer pipe 15. According to FIGS. 3 and 5, the outer pipe 15 may have two positioning contours 28 for this, which bring about a positive-locking positioning of the partition 16. The respective contour 28 is formed here by a positioning support 29, which is formed in the outer pipe 15 and with which a lateral edge area 30 of the partition 16 meshes. The positioning contours 28 are arranged diametrically opposite each other in the example. Further, the two positioning contours 28 are arranged each approximately centrally between the engine flange 11 and the turbine flange 12. The positioning contours 28 are designed such that the partition 16 is fixed relative to the outer pipe 15 in relation to a direction 31 of the gap between the engine flange 11 and the turbine flange 12, whereas the partition 16 is arranged movably in the positioning contours 28 at right angles to the direction 31 of the gap. The positioning contours 28 form fixed mounts here, so that the partition 16 can expand thermally starting from the positioning contours 28.

Figure 3:
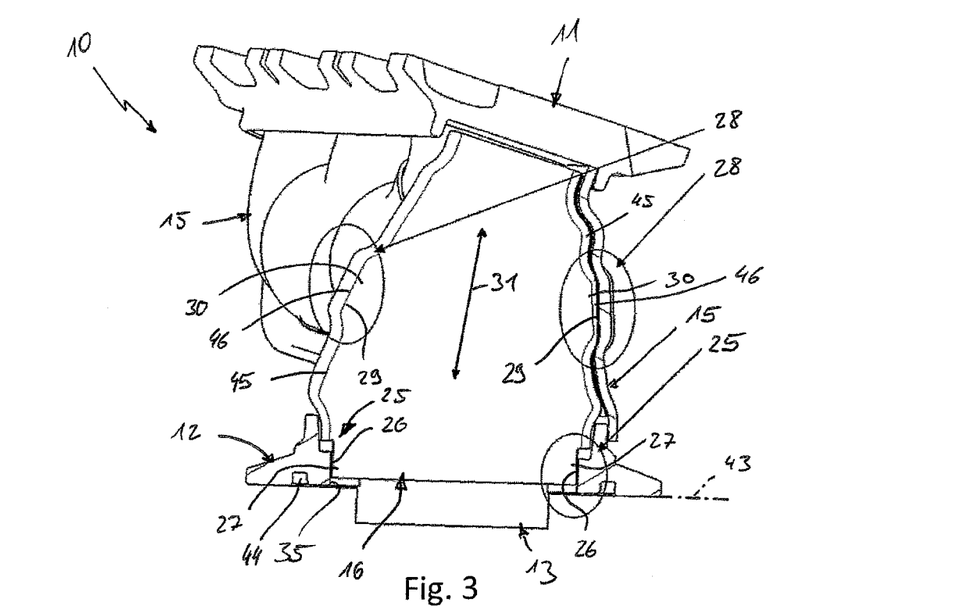
FIG. 3 is an axial sectional view of the exhaust manifold through the turbine flange.
Figure 4:
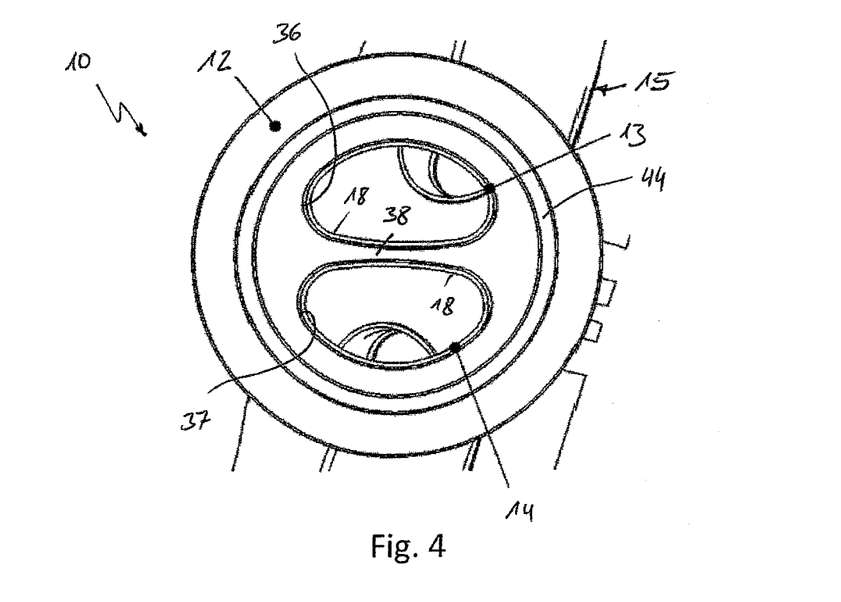
FIG. 4 is an axial view of the exhaust manifold in the area of the turbine flange in another embodiment.
Figure 5:
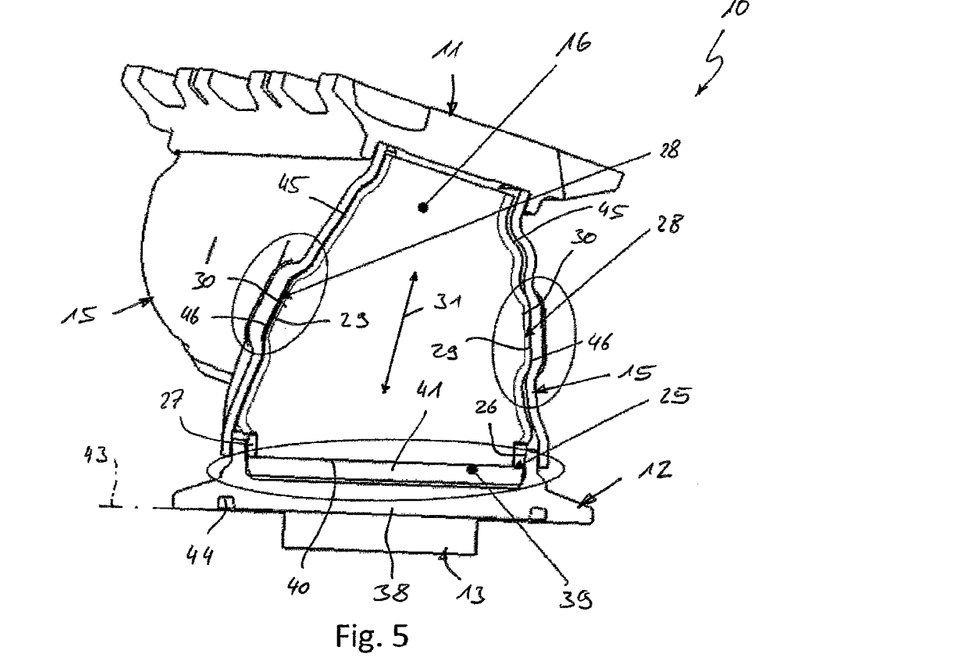
FIG. 5 is an axial view of the exhaust manifold through the turbine flange in the embodiment shown in FIG. 4.
Figure 6:
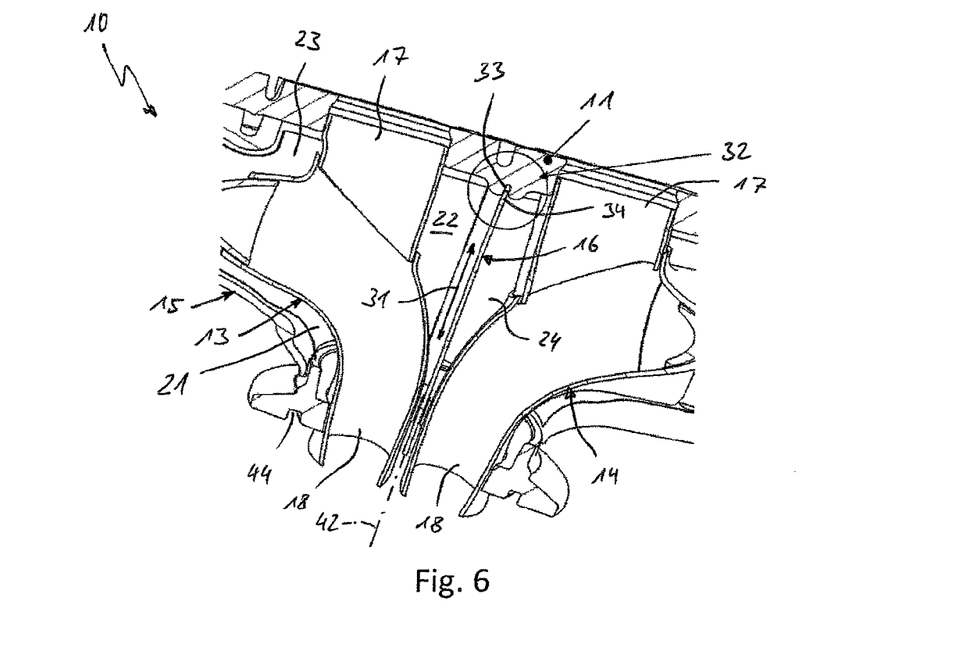
FIG. 6 is a longitudinal sectional view of the exhaust manifold in the area of the turbine flange.

According to FIGS. 3, 5 and 6, the partition 16 is advantageously also arranged loosely at the engine flange 11, i.e., it is not fixed to it directly. The engine flange 11 may have for this at least one holding contour 32 according to FIG. 6, which brings about positive-locking holding of the partition 16. The respective holding contour 32 is formed in the example by a holding support 33, which is formed directly on the engine flange 11 and with which a front-side edge area 34 of the partition 16 meshes in a positive-locking manner.

As can be seen especially in FIG. 6, the inner pipes 13, 14 are of a multipart design, so that they are consequently composed of a plurality of individual pipes.

Figure 2:
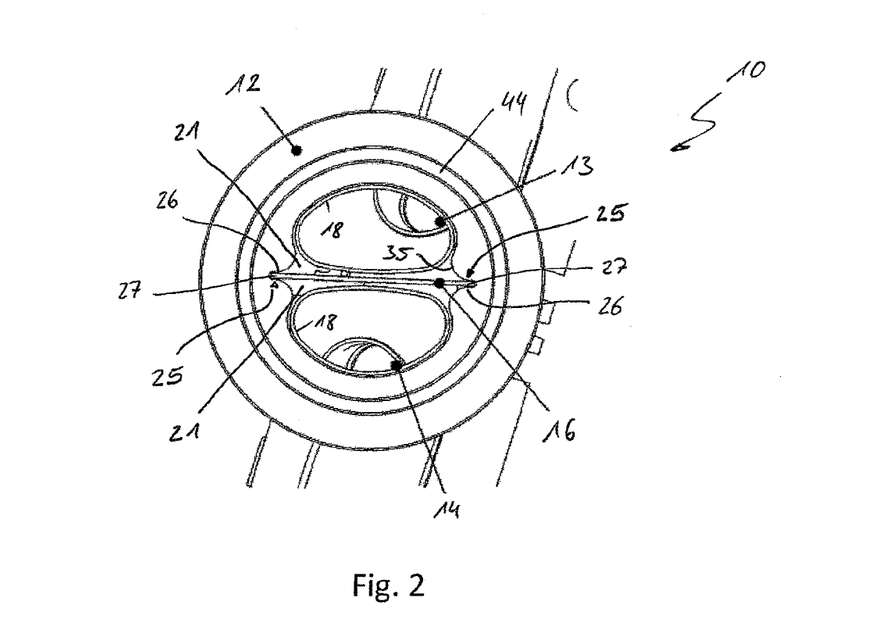
FIG. 2 is an axial view of the exhaust manifold in the area of a turbine flange.

The turbine flange 12 is designed as an open flange in the embodiment shown in FIGS. 2 and 3, as a result of which the air gap insulation 21 is visible especially in the axial view according to FIG. 2. The turbine flange 12 has a single flange opening 35 in this case, through which both inner pipes 13, 14 are led. This common flange opening 35 thus encloses both inner pipes 13, 14 each in the area of the respective outlet opening 18. An inner edge of the flange opening 35, not designated specifically, is flatly and sealingly in contact with the respective inner pipe 13, 14 in a circumferential section facing away from the partition 16. Contrary to this, the partition 16 ends in a detached manner in the flange opening 35. As can be recognized, the partition 16 is located now at a spaced location from both inner pipes 13, 14. It can be recognized especially from FIG. 3 that the partition 16 has no axial obstacle at the flange 12 and is consequently movable within the guide contours 25.

Contrary to FIGS. 2 and 3, FIGS. 4 and 5 show an embodiment in which the turbine flange 12 has a closed design. The air gap insulation 21 is not consequently visible here. The turbine flange 12 has two separate flange openings 36, 37 in this case, through which one each of the inner pipes 13, 14 is passed. Thus, each flange opening 36, 37 encloses one of the two inner pipes 13, 14 in the area of the corresponding outlet opening 18. An inner wall of the respective flange opening 36, 37, not designated more specifically, is flatly in contact with the respective inner pipe 13, 14, extending circularly in a closed pattern in the circumferential direction. The turbine flange 12 has in this embodiment a middle web 38, which passes through between the two inner pipes 13, 14 and which separates the two flange openings 36, 37 from each other.

According to FIG. 5, the partition 16 is supported in this embodiment at a support area 39 of the turbine flange 12, namely, via a front side 40 facing the turbine flange 12. This support area 39 may have at least one elastic support element 41, which may be especially a wire mesh element, which will likewise be designated by 41 hereafter.

As can be determined especially from FIGS. 2 and 6, the partition 16 is arranged in a detached manner in relation to the inner pipes 13, 14. Further, the partition 16 is preferably of a flat design, so that it extends in the partition plane 42 suggested in FIG. 6. The partition 16 advantageously meshes with the guide supports 25, positioning supports 28 and holding support 32 in parallel to the partition plane 42. Further, the partition 16 is arranged movably in the guide contours 25, in the positioning contours 28 and in the holding contour 32 in parallel to the partition plane 42. This mobility is oriented in parallel to the direction 31 of the gap in the guide contours 25 and in the holding contour 32 and at right angles to the direction 31 of the gap in the positioning contours 28. Further, the partition plane 42 extends essentially at right angles to a flange plane 43 of the turbine flange 12 shown in FIGS. 3 and 5, in which plane the turbine flange 12 extends.

Finally, a ring groove 44 can be recognized in FIGS. 2 through 6, wherein said groove 44 is milled into the turbine flange 12 and a seal can be inserted into it in order to seal the connection between the turbine flange 12 and a flange of the turbine 8, which latter flange is complementary thereto.

As can be seen especially in FIGS. 3 and 5, the positioning contour 28 is positioned in the embodiments shown here at a spaced location from the engine flange 11 and at a spaced location from the turbine flange 12, so that it does not extend over the respective entire side wall 45 of the partition 16. A projection 46, which projects from the respective side wall 45 outwardly and forms the edge area 30 of the partition 16 meshing with the positioning support 29, is correspondingly formed at the respective side wall 45.

While specific embodiments of the invention have been shown and described in detail to illustrate the application of the principles of the invention, it will be understood that the invention may be embodied otherwise without departing from such principles.

What is claimed is:

1. Air gap-insulated exhaust manifold for a supercharged internal combustion engine, the exhaust manifold comprising:
    an engine flange for fastening the exhaust manifold to an engine block of the internal combustion engine;
    a turbine flange for fastening the exhaust manifold to a turbine of an exhaust gas turbocharger;
    two separate inner pipes, which lead each from at least one inlet opening for exhaust gas arranged in the area of the engine flange to an outlet opening for exhaust gas arranged in the area of the turbine flange;
    an outer pipe, which envelopes the two inner pipes, forming an air gap insulation, the outer pipe extending between the engine flange and the turbine flange; and
    a separate partition, which separates an interior space of said outer pipe into two interior spaces, one of said two inner pipes being arranged in one of said two interior spaces and another one of said two inner pipes being arranged in another one of said two interior space, wherein the partition is arranged at the turbine flange such that said partition is movable relative to the turbine flange, wherein the partition is movably retained in at least one holding contour at the engine flange, the at least one holding contour being formed by a holding support of the engine flange, wherein a front-side edge area of the partition engages the holding support such that said front-side edge area is movably retained by the holding support, wherein the partition is movable relative to the turbine flange and the engine flange when said partition is exposed to a thermal load, wherein the partition is guided by guide contours of the turbine flange such that the partition is movably retained by said turbine flange, wherein said manifold comprises a linear manifold portion located adjacent to said turbine flange, said partition being expandable in an axial direction relative to said turbine flange and said engine flange when said partition is exposed to said thermal load, wherein said axial direction is parallel to said linear manifold portion.

2. An exhaust manifold in accordance with claim 1, wherein:
    the respective guide contour is formed by a guide support, the guide support being formed in the turbine flange; and
    a lateral edge area of the partition engages the guide support in a positive-locking manner.

3. An exhaust manifold in accordance with claim 1, wherein the partition is positioned in positioning contours at the outer pipe such that said partition is positively locked to said outer pipe.

4. An exhaust manifold in accordance with claim 3, wherein:
    the respective positioning contour is formed by a positioning support, the positioning support being formed in the outer pipe; and
    a lateral edge area of the partition engages the positioning support in a positive-locking manner.

5. An exhaust manifold in accordance with claim 1, wherein the turbine flange has a single flange opening, which surrounds the two inner pipes in the area of the respective outlet opening and in which the partition ends on a front side in a detached manner.

6. An exhaust manifold in accordance with claim 1, wherein:
    the turbine flange has two separate flange openings, each of the two separate flange openings enclose a respective one of the inner pipes in the area of the respective outlet opening; and
    a front side of the partition is supported on a support area of the turbine flange.

7. An exhaust manifold in accordance with claim 6, wherein the support area has at least one elastic support element, via which the front side of the partition is supported on the turbine flange.

8. An exhaust manifold in accordance with claim 7, wherein the respective support element is formed by a wire mesh element.

9. An exhaust manifold in accordance with claim 1, wherein the partition is arranged in a detached manner in relation to the inner pipes.

10. An exhaust manifold in accordance with claim 1, wherein the partition is of a flat design and extends in a partition plane.

11. An exhaust manifold in accordance with claim 10, wherein at least one of:
    the partition is guided by the guide contours at the turbine flange such that the partition is positively locked to the turbine flange;
    the partition is positioned in positioning contours at the outer pipe such that the partition is positively locked to the outer pipe, and wherein at least one of:
    the partition engages with the respective guide support in parallel to the partition plane;
    the partition engages with the respective positioning support in parallel to the partition plane;
    the partition engages with the respective holding support in parallel to the partition plane;
    the partition is arranged movably in the respective guide contour in parallel to the partition plane;
    the partition is arranged movably in the respective positioning contour in parallel to the partition plane;
    the partition is arranged movably in the respective holding contour in parallel to the partition plane; and
    the partition is oriented at right angles to a flange plane in which the turbine flange extends.

12. An exhaust system for a supercharged internal combustion engine of a motor vehicle, the exhaust system comprising:
    a turbine of an exhaust gas supercharger; and
    an exhaust manifold for connecting an engine block of the internal combustion engine with the turbine, the exhaust manifold comprising:
    an engine flange for fastening the exhaust manifold to an engine block of the internal combustion engine;
    a turbine flange for fastening the exhaust manifold to a turbine of an exhaust gas turbocharger;
    two separate inner pipes, which lead each from at least one inlet opening for exhaust gas arranged in the area of the engine flange to an outlet opening for exhaust gas arranged in the area of the turbine flange;

an outer pipe, which envelopes the two inner pipes, forming an air gap insulation, the outer pipe extending between the engine flange and the turbine flange; and a separate partition, which separates an interior space of the outer pipe into two interior spaces, one of the two inner pipes being arranged in one the two interior spaces and another one of the two inner pipes being arranged in another one of the two interior spaces, wherein the partition is movably retained by the turbine flange such that the partition is axially movable relative to the turbine flange based on thermal stress, the partition being movably retained by at least one holding contour of a holding support of the engine flange, wherein a front-side edge area of the partition engages the holding support such that the front-side edge area of the partition is movably retained by the holding support, wherein said partition is axially movable relative to the engine flange based on said thermal stress, said manifold comprising a linear manifold portion arranged adjacent to said turbine flange, said partition being axially expandable in an axial direction, said axial direction being parallel to said linear manifold portion.

13. An exhaust system in accordance with claim 12, wherein:
the partition is guided by guide contours of the turbine flange such that the partition is movably retained by the turbine flange;
the respective guide contour is formed by a guide support formed in the turbine flange; and
a lateral edge area of the partition engages the guide support such that the lateral edge area of the partition is positively locked to the guide support.

14. An exhaust system in accordance with claim 12, wherein:
the partition is positioned in positioning contours of the outer pipe such that the partition is movably retained by the outer pipe;
the respective positioning contour is formed by a positioning support formed in the outer pipe; and
a lateral edge area of the partition engages the positioning support such that the lateral edge area of the outer pipe is movably retained by the positioning support.

15. An exhaust system in accordance with claim 12, wherein the turbine flange has a single flange opening, which surrounds the two inner pipes in the area of the respective outlet opening and in which the partition ends on a front side in a detached manner.

16. An exhaust system in accordance with claim 12, wherein:
the turbine flange has two separate flange openings, each of the two separate flange openings enclose a respective one of the inner pipes in the area of the respective outlet opening;
a front side of the partition is supported on the on a support area of the turbine flange; and
the support area has at least one elastic support element, via which the front side of the partition is supported on the turbine flange.

17. Air gap-insulated exhaust manifold for a supercharged internal combustion engine, the exhaust manifold comprising:
an engine flange for fastening the exhaust manifold to an engine block of the internal combustion engine, said engine flange having a holding support, said holding support having a holding support surface;
a turbine flange for fastening the exhaust manifold to a turbine of an exhaust gas turbocharger;
two separate inner pipes, which lead each from at least one inlet opening for exhaust gas arranged in an area of the engine flange to an outlet opening for exhaust gas arranged in an area of the turbine flange;
an outer pipe, which surrounds the two inner pipes, forming an air gap insulation, the outer pipe extending between the engine flange and the turbine flange, said outer pipe having an outer pipe interior space; and
a separate partition separating said outer pipe interior space into two interior spaces, one of said two inner pipes being arranged in one of said two interior spaces and another one of said two inner pipes being arranged in another one of said two interior spaces, said partition having a front-side edge area, said front-side edge area being in direct contact with said holding support surface, wherein the partition is movably retained by said holding support such that said partition is axially expandable relative to said turbine flange and said engine flange upon said partition being exposed to a thermal load, said manifold comprising a linear manifold portion arranged adjacent to said turbine flange, said partition being axially expandable in an axial direction, said axial direction being parallel to said linear manifold portion.

18. An exhaust manifold in accordance with claim 17, wherein said axial direction is parallel to a longitudinal axis of said turbine flange and a longitudinal axis of said engine flange.

* * * * *